Sept. 15, 1942.  E. T. MEAKIN  2,295,743
EXTRUDING APPARATUS
Filed Sept. 25, 1937  2 Sheets-Sheet 1
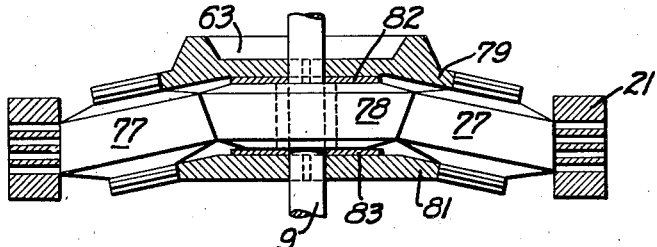
INVENTOR.
EDGAR T. MEAKIN
BY Charles O. Bruce
HIS ATTORNEY.

Sept. 15, 1942.    E. T. MEAKIN    2,295,743
EXTRUDING APPARATUS
Filed Sept. 25, 1937    2 Sheets-Sheet 2
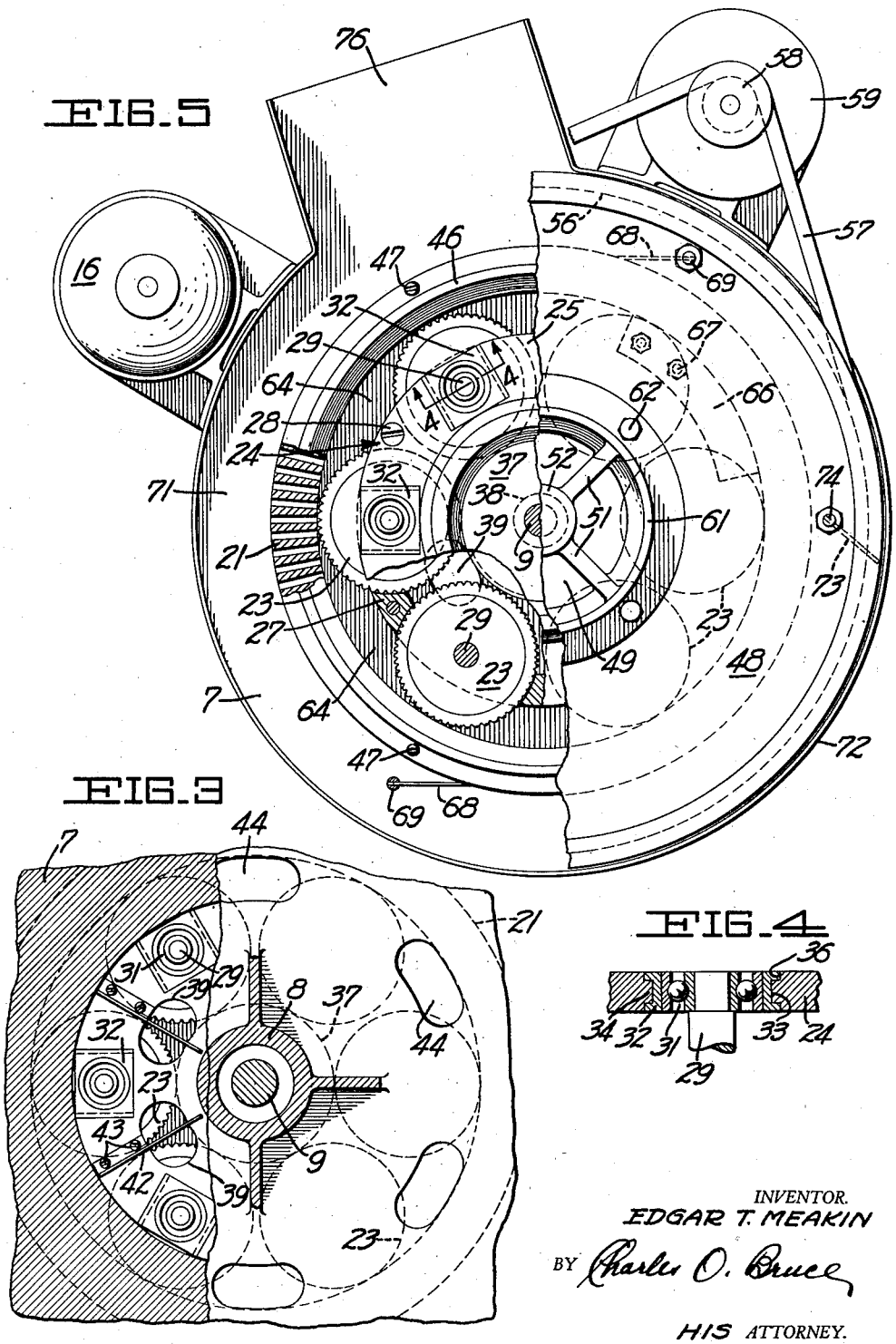
INVENTOR.
EDGAR T. MEAKIN
BY Charles O. Bruce
HIS ATTORNEY.

Patented Sept. 15, 1942

2,295,743

UNITED STATES PATENT OFFICE 2,295,743

EXTRUDING APPARATUS

Edgar T. Meakin, San Francisco, Calif.

Application September 25, 1937, Serial No. 165,777

20 Claims. (Cl. 107—8)

My invention relates to extruding apparatuses and particularly to an apparatus of the die ring and extrusion roller type for forming pellets from moldable materials.

The principal object of my invention is to provide an improved extruding machine of the die ring and extrusion roller type for forming pellets from moldable materials.

Other objects of my invention are: To provide a compact and durable machine of the class described, having a large capacity and which may be economically manufactured; to provide in apparatus of the class described improved means for supporting the extrusion rollers and thrust absorbing means; to provide an extrusion apparatus of the class described, in which the extruding structure may be quickly and readily removed and assembled for replacement or repair; to provide, in an extrusion apparatus employing a roller cage, means for clearing the cage of excess material; to provide in such apparatus means for uniformly distributing the moldable material to the extrusion chamber; and to provide in apparatus of the class described means for pre-compacting the material in the extrusion chamber to increase the capacity of the apparatus.

My invention possesses numerous other objects and features of advantage, some of which, together with the foregoing, will be set forth in the following description forming a part of this specification, but I do not limit myself to the specific embodiment of my invention herein described, as various changes and modifications thereof may be resorted to without departing from the scope of the claims.

Referring to the drawings:

Figure 1 is a vertical sectional view of an extrusion apparatus incorporating my invention.

Figure 2 is a vertical sectional view partly in elevation of a modified form of the extrusion rollers and thrust absorbing roller together with the supporting structure therefor.

Figure 3 is a view from the bottom of the apparatus looking toward the plane indicated by the line 3—3 of Figure 1. Portions of the structure are thus shown broken away to clearly indicate the construction.

Figure 4 is a fragmentary sectional view of the roller spindle bearing and supporting structure taken in a plane indicated by the line 4—4 of Figure 5.

Figure 5 is a plan view of the apparatus, a portion of the structure being shown broken away to illustrate the arrangement and relation of the elements.

Broadly stated, the apparatus of my invention comprises a perforated die ring and a plurality of rollers adapted to compress and force materials through such perforations upon relative movement between the ring and rollers. Means is provided for causing such relative movement, such movement being preferably effected by rotating the rollers around the ring, but it is obvious that the ring could just as well be rotated around the rollers without departing from the spirit of my invention.

Means is provided for supporting the rollers which preferably comprises a cage of less diameter than that of the ring and in which the rollers are removably mounted, and means is further provided whereby any material carried into the cage by the rollers may be discharged therefrom.

Knives are provided for severing the extruded material into pellets of suitable size, and means is further provided for uniformly distributing, preferably through centrifugal action, the material adjacent the face of the die ring for extrusion by the rollers.

In detail and with reference to the preferred embodiment of my invention, as shown in the drawings, my apparatus comprises a frame 6 preferably of cylindrical form having a top end block 7 provided with a centrally disposed hub 8 through which a drive shaft 9 passes, the shaft being suitably journaled in a pair of bearing assemblies 11 and 12 positioned at opposite ends of the hub. The lower end of shaft 9 is adapted to receive a driven pulley 13 which is connected to a drive pulley 14 carried by a motor 16 or other suitable prime mover preferably mounted on the frame, by means of a V belt 17, the belt passing through a suitable opening 18 in the side of the cylindrical frame 6.

The top face of end block 7 is provided, at a point spaced inwardly from the periphery thereof, with an annular groove 19 adapted to receive a radially perforated die ring 21 which is removably secured therein and to the plate by means of stud bolts 22.

Means is provided for compressing and forcing materials through the die perforations which preferably comprises a plurality of rollers 23 equally spaced about the inner face of the die ring and in contact therewith. Means is provided for supporting the rollers for orbital movement around the face of the die ring. For this purpose I provide a roller cage, indicated generally by the numeral 24, of less diameter than the die ring, formed of a pair of spaced annular members 25 and 26, each of which is splined or otherwise removably secured to shaft 9 for rotation therewith. The annular members are preferably connected to each other adjacent their peripheries through a plurality of spacer blocks 27. I prefer that the spacer blocks be cast integral with the bottom member 26 and that the top member 25 be secured thereto by means of set screws 28 thus facilitating assembly and replacement. It will be noted that the blocks are of such size and shape and so spaced about the cage that each pair is adapted to snugly receive therebetween and between the top and bottom members of the cage one of the rollers 23.

To reduce friction and to facilitate rapid installation and replacement of the rollers, I prefer to mount the same in the roller cage in the following manner: Each roller is preferably provided with a spindle 29 which projects beyond the opposite ends thereof and such projecting ends are journaled in bearing assemblies 31, each of which is preferably secured in a bearing block 32. Two sides of the bearing block, see Figure 4, are formed with grooves 33 which are adapted to be received on the tongues 34 provided on the opposite sides of a recess 36 formed in the peripheries of the roller cage members 25 and 26 between the spacer blocks 27. It is thus seen that the rollers may be readily removed and replaced in the cage by merely withdrawing or inserting the bearing blocks for each roller from or in their respective recesses.

In order that the tremendous thrust stresses on the rollers occasioned during extrusion will not have to be borne by the roller spindle and mountings, I provide a radial thrust roller 37 which is carried by the roller cage and disposed between the adjacent faces of the extrusion rollers 23. This thust roller is provided with a central aperture 38 of greater diameter than the shaft so that the roller may move laterally and freely float within the cage. It is obvious that the thrust stresses of extrusion upon the extrusion rollers will be neutralized by the thrust roller and that the spindles and spindle mountings will be free of the wear and tear of such stresses.

I have found that it is of advantage to provide the peripheries of the extrusion rollers and that of the thrust roller with corrugations or grooves in such manner as to prevent compaction of materials therebetween and to facilitate the normal rotation thereof. In this connection I prefer, as illustrated in Figure 1, to extend the corrugations or grooves transversely across the face of the extrusion roller and peripherally around the thrust roller.

In the extrusion of many substances which are capable of consolidating under relatively light pressures, it is obvious that the thrust roller may be dispensed with since the spindles and their mountings are adequate to take the stress of extrusion. However, with relatively hard materials where extrusion can only be effected with high pressures, the use of the thrust roller has been found particularly advantageous in relieving the roller spindle and mounting of excessive wear.

It is apparent that in operation certain of the materials will be carried by the extrusion rollers past the spacer blocks 27 into the roller cage where it will collect and compact and, unless discharged, cause undue friction and binding of parts. It is, therefore, important that such material be cleared from the cage and to accomplish this I provide a plurality of openings 39 in the bottom member 26 of the cage through which the material may drop into an annular chamber or recess 41 formed in the top face of end block 7. Scrapers 42 secured by means of set screws 43 to the bottom of cage member 26 and projecting into the chamber are provided for scraping the material so collected into a plurality of discharge outlets 44 which open from the chamber through end block 7.

A material deflecting ring 46 is provided for the upper edge of the die ring for preventing the material from escaping over the edge of the die and for deflecting the same toward the extrusion mechanism. This ring is preferably removably secured to the die ring by means of stud bolts 47. Upon the deflecting ring 46 rests an annular plate 48 of greater diameter than the die ring and the same is provided with a centrally positioned and tapered orifice 49 into which project a plurality of radial arms 51 for supporting a cylindrical housing 52. This housing is provided with a pair of bearing assemblies 53 and 54 adapted to receive the upper end portion of shaft 9 so that the plate 48 is supported and journaled for independent rotation thereon. The plate is preferably provided with a peripheral groove 56 adapted to receive a V belt 57 driven by a pulley 58 carried by a suitable prime mover 59 which is preferably mounted on the frame 6, and I prefer that the direction of rotation of the plate shall be opposite to that of the roller cage.

A cylindrical hopper 61 secured by means of bolts 62 to the upper face of plate 48 in alignment with the orifice is provided through which materials may be admitted to the apparatus. Material so admitted drops by gravity into a flared bowl 63 formed on the top of the cage member 25, and from which it is centrifugally distributed, by rotation of the roller cage, to extrusion chambers 64, such chambers, as shown in Figure 5, being formed between the peripheries of adjacent rollers and the opposed faces of the die ring and cage.

It is highly important that the extrusion chambers be supplied with material in a uniform manner in order to obtain maximum extrusion and a uniform product. I have found that through the centrifugal distribution of materials, all extrusion chambers may be uniformly supplied with materials at all times whereby maximum extrusion results and a uniform product is obtained.

I have found that the capacity of the apparatus can be stepped up if the quantity of material is increased in the compression chambers by precompaction therein. Means is therefore provided for this purpose, which preferably comprises a fin 66 secured at one end to the bottom face of plate 48 by means of bolts 67. The fin is bent downwardly at an angle to the face of the plate so that its lower end is positioned between the periphery of the cage member 25 and the inner face of the die ring and substantially in contact with the passing ends of the extrusion rollers. It is obvious that in operation the fin will crowd the material distributed from the bowl downwardly into the compression chambers and pre-compact the same therein, thus increasing the capacity of the apparatus.

While I have shown but one fin, it is to be understood that a plurality of fins could be employed to suit the desires of the user, all without departing from my invention, and this I contemplate where the material to be extruded is light and fluffy in character.

Suitable knives 68 are provided for severing the strings of material into pellets as the same is extruded through the die apertures. Each knife is provided with a handle 69 secured in any well known manner to the plate 48 adjacent the outer face of the die ring. Thus as the plate rotates the knives are caused to pass transversely across the die apertures to effect severance of the material extruded therethrough. It is apparent that the length of pellets under any extrusion speed may be determined by the number of knives and the speed at which they are rotated.

The severed material falls into a trough 71, the outer wall of which is formed by a skirt 72 of sheet iron or the like welded or otherwise secured in any well known manner to the periphery of the block 7. A scraper 73 provided with a handle 74 secured to plate 48 is provided for scraping the severed material around the trough and into the discharge chute 76 from which it may be collected in any suitable manner.

Through continued usage the extrusion rollers are subjected to considerable wear, particularly so when the materials acted upon contain abrasive particles. In my apparatus when the surfaces become so worn that the space between the rollers and die retards the efficiency of the device, instead of replacing the extrusion rollers I merely remove the thrust roller and substitute therefor another of such diameter as to compensate for the wear. Thus I materially reduce the cost of replacements.

The life of the extruding structure may also be prolonged by employing an alternative form of extrusion and thrust roller construction such as shown in Figure 2. Here the extrusion rollers 77 and thrust roller 78 are coned instead of cylindrical and the annular cage members 79 and 81 slant downwardly so as to position the peripheries of the extrusion rollers parallel to the surface of the die ring 21. Interposed between the ends of the thrust roller and the cage members are suitable spacing washers 82 and 83, through each of which shaft 9 passes. As wear occurs on the working faces of the rollers these washers may be removed and replaced with others of the desired thickness whereby the thrust roller may be moved downwardly to force the extrusion rollers into correct operative engagement with the face of the die.

It is obvious that in the foregoing alternative form of structure certain slippage will occur between the cooperative surfaces of the coned rollers and cylindrical die. However, such slippage is not objectionable but to the contrary is advantageous since it serves to aid the consolidation of the material by imparting a twisting stress thereto.

I claim:

1. In apparatus of the class described, a horizontally positioned perforated die ring, means for supporting said die ring, a plurality of rollers disposed adjacent the inner face of said die ring and adapted to compress and force material through the perforations thereof upon relative movement between said die ring and said rollers, means for causing said relative movement, and means disposed above the upper ends of said rollers for centrifugally distributing said material adjacent the face of said die ring for extrusion therethrough by said rollers.

2. In apparatus of the class described, a perforated die ring, means for supporting said die ring, a plurality of rollers, means for supporting said rollers adjacent the inner face of said die ring, means for rotating said supporting means to move said rollers in an orbital path around the inner face of said die ring, and means comprising a flared bowl for centrifugally distributing material adjacent the inner face of the die ring for extrusion therethrough by said rollers.

3. In apparatus of the class described, a perforated die ring, means for supporting said die ring, a cage disposed within the area surrounded by said die ring, a plurality of rollers supported by said cage for engagement with the inner face of said die ring, means for moving said rollers around the face of said die ring to effect extrusion of material through the perforations thereof, and thrust absorbing means disposed within said cage and cooperative with said rollers for neutralizing the radial thrust stress on said cage occasioned during extrusion.

4. In apparatus of the class described, a perforated die ring, means for supporting said die ring, a cage disposed within the area surrounded by said die ring, a plurality of extrusion rollers supported by said cage for engagement with the inner face of said die ring, means for moving said rollers around the face of said die ring to effect extrusion of materials through the perforations thereof, and a thrust absorbing roller disposed within said cage and cooperative with said extrusion rollers for neutralizing the radial thrust stress on said cage occasioned during extrusion.

5. In apparatus of the class described, a perforated die ring, means for supporting said die ring, a cage disposed within the area surrounded by said die ring, a plurality of extrusion rollers supported by said cage for engagement with the inner face of said die ring and having a plurality of grooves extending transversely across the peripheries thereof, means for moving said rollers around the face of said die ring to effect extrusion of materials through the perforations thereof, and a thrust absorbing roller disposed within said cage and cooperative with said extrusion rollers for neutralizing the radial thrust stress on said cage occasioned during extrusion, said thrust roller having a plurality of grooves extending around the periphery thereof.

6. In apparatus of the class described, a perforated cylindrical die ring, means for supporting said die ring, means supporting a plurality of coned extrusion rollers with each disposed adjacent the inner face of said die ring for compressing and forcing material through the perforations thereof upon relative movement between said die ring and said rollers, means for causing said relative movement, and a coned thrust absorbing roller cooperative with said extrusion rollers for neutralizing the radial thrust stress on said roller supporting means occasioned during extrusion.

7. In apparatus of the class described, a perforated cylindrical die ring, a cage disposed within the area surrounded by said die ring, a plurality of coned extrusion rollers supported by said cage for engagement with the inner face of said die ring, means for moving said extrusion rollers around the face of said die ring to effect extrusion of material through the perforations thereof, and a coned thrust absorbing roller disposed within said cage and cooperative with said extrusion rollers for neutralizing the radial thrust stress on said cage occasioned during extrusion.

8. In apparatus of the class described, a perforated cylindrical die ring, means for supporting said die ring, a cage disposed within the area surrounded by said die ring, a plurality of coned extrusion rollers supported by said cage for engagement with the inner face of said die ring, means for moving said rollers around the face of said die ring to effect extrusion of materials through the perforations thereof, a coned thrust absorbing roller disposed within said cage and cooperating with the peripheries of said extrusion rollers for neutralizing the radial thrust stress on said cage occasioned during extrusion, and means interposed between the ends of said thrust roller and said cage for positioning said thrust roller with reference to said extrusion rollers to normally maintain the latter in a predetermined position with reference to the inner face of said die ring.

9. In apparatus of the class described, a perforated die ring, means for supporting said die ring, an annular cage disposed within the area surrounded by said die ring and comprising a pair of spaced members connected at their peripheries by a plurality of spaced blocks, said members having a pair of aligned recesses in the peripheries thereof between each adjacent pair of said blocks, a bearing block adapted to be slidably received and supported in each of said recesses, a spindle journaled in the bearings of each pair of said bearing blocks, a roller journaled on each spindle and adapted to engage the inner face of said die ring, and means for moving said rollers around the face of said die to effect extrusion of material through the perforations thereof.

10. In a device of the class described, a perforated die ring, means for supporting said die ring, a cage disposed within the area surrounded by said die ring and having an opening in the bottom thereof for the evacuation of material, a plurality of rollers supported by and projecting into said cage and adapted for cooperative engagement with the inner face of said die ring, and means for rotating said cage to move said rollers around the inner face of said die ring.

11. In a device of the class described, a block having an annular recess in the top thereof and a discharge aperture opening from the bottom of said recess, a perforated die ring mounted on said block around said recess, a plurality of rollers, an annular cage disposed within the area surrounded by said die ring and in axial alignment with said recess for supporting said rollers in cooperative engagement with the inner face of said die ring, said cage having an opening in the bottom thereof for the discharge of material into said recess, and means for rotating said cage to move said rollers around the inner face of said die ring.

12. In a device of the class described, a block having an annular recess in the top thereof and a discharge aperture opening from the bottom of said recess, a perforated die ring mounted on said block around said recess, a plurality of rollers, an annular cage disposed within the area surrounded by said die ring and in axial alignment with said recess for supporting said rollers in cooperative engagement with the inner face of said die ring, said cage having an opening in the bottom thereof for the discharge of material into said recess, means disposed within said recess and cooperative with said discharge aperture for evacuating the material discharged into said recess from said cage, and means for rotating said cage to move said rollers around the inner face of said die ring.

13. In a device of the class described, a block having an annular recess in the top thereof and a discharge aperture opening from the bottom of said recess, a perforated die ring mounted on said block around said recess, a plurality of rollers, an annular cage disposed within the area surrounded by said die ring and in axial alignment with said recess for supporting said rollers in cooperative engagement with the inner face of said die ring, said cage having an opening in the bottom thereof for the discharge of material into said recess, a scraper carried by said cage and projecting into said recess and adapted upon rotation of said cage to scrape said material into said discharge aperture to evacuate said recess, and means for rotating said cage to actuate said scraper and to move said rollers around the inner face of said die ring.

14. In a device of the class described, a perforated die ring, means for supporting said die ring, a plurality of spaced rollers disposed within the area surrounded by said die ring, a cage for supporting said rollers adjacent the inner face of said die ring and adapted to provide between the peripheries of adjacent rollers and the inner face of the die ring a plurality of chambers for the reception of material, a rotatable member overlying said chambers and having an inclined fin adapted to urge said material into said chambers, and means for moving said rollers around the inner face of said die ring to compress and force said material through the perforations thereof.

15. In a device of the class described, a perforated die ring, means for supporting said die ring, a plurality of spaced rollers, a cage for supporting said rollers adjacent the inner face of said die ring and adapted to provide between the peripheries of adjacent rollers and the inner face of the die ring a plurality of chambers for the reception of material, a rotatable plate overlying said chambers and having an inclined fin adapted to urge said material into said chambers, means for moving said rollers around the inner face of said die ring to compress and force said material through the perforations thereof, and a knife carried by said plate for severing the material into pellets as it is extruded through said perforations.

16. In a device of the class described, a frame, an upright shaft journaled in said frame, a perforated die ring concentrically disposed about said shaft, a plurality of rollers disposed for cooperative engagement with the inner face of said die ring, a cage journaled on and rotatable with said shaft for supporting said rollers, said cage being adapted to provide between the peripheries of adjacent rollers and the inner face of the die ring a plurality of chambers for the reception of material, a plate journaled on said shaft and adapted to overlie said chambers, an inclined member carried by said plate and adapted to urge said material into said chambers upon rotation of said plate, means for rotating said plate, and means for rotating said shaft and cage to move said rollers around the inner face of said die ring.

17. In a device of the class described, a frame, an upright shaft journaled in said frame, a horizontally positioned perforated die ring concentrically disposed about said shaft, a deflecting ring secured to the upper end of said die ring, a plurality of rollers disposed adjacent the inner face of said die ring, a cage journaled on and rotatable with said shaft for supporting said rollers, said cage being adapted to provide between the peripheries of adjacent rollers and the inner face of said die ring a plurality of chambers for the reception of material, a plate overlying said chambers and in contact with said deflecting ring, means for journaling said plate on said shaft, an inclined member connected to said plate and adapted to pass over said chambers upon rotation of said plate for urging said material into said chambers, means connected with the periphery of said plate for rotating the same, and means for rotating said shaft and cage in a direction opposite to the direction of rotation of said plate.

18. In a device of the class described, a perforated die ring, means for supporting said die ring, a plurality of rollers disposed within said die ring adjacent the inner face thereof, a cage for supporting said rollers and adapted to provide between the peripheries of adjacent rollers and the inner face of said die ring a plurality of chambers for the reception of material, a rotatable plate overlying said die ring and having a downwardly extending member adapted to urge said material into said chambers, means for moving said rollers around the inner face of said die ring for extruding said material through the perforations thereof, a knife disposed on said plate for severing the material into pellets as it is extruded through said perforations, a trough disposed adjacent the outer face of said die ring for receiving the severed pellets, said trough having a discharge chute in one side thereof, and a scraper carried by said plate and extending into said trough for conveying the severed pellets to said chute.

19. In apparatus of the class described, a perforated die ring, means for supporting said die ring, an annular cage disposed within the area surrounded by said die ring, a plurality of rollers supported by said cage adjacent the inner face of said die ring for compressing and forcing material through the perforations thereof upon rotation of said cage, and means disposed on an outer end of said cage for centrifugally distributing said material across one end of said rollers and toward the peripherey of the die ring for extrusion therethrough by said rollers.

20. In apparatus of the class described, a peripherally perforated die ring having a cylindrical bore, means for supporting said die ring, means supporting a plurality of coned rollers adjacent the inner face of said die ring and adapted to compress and force material through the perforations thereof upon relative movement between said die ring and said rollers, means for causing said relative movement, and thrust absorbing means associated with said rollers for neutralizing the radial thrust stress on said roller supporting means occasioned during extrusion.

EDGAR T. MEAKIN.